US010844789B2

(12) United States Patent
Bunel et al.

(10) Patent No.: US 10,844,789 B2
(45) Date of Patent: Nov. 24, 2020

(54) DEVICE FOR COOLING A TURBINE CASING WITH AIR JETS

(71) Applicant: SAFRAN AIRCRAFT ENGINES, Paris (FR)

(72) Inventors: Jacques Marcel Arthur Bunel, Moissy-Cramayel (FR); Emeric D'Herbigny, Moissy-Cramayel (FR); Pierre Tincelin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 23 days.

(21) Appl. No.: 16/094,229

(22) PCT Filed: Apr. 13, 2017

(86) PCT No.: PCT/FR2017/050893
§ 371 (c)(1),
(2) Date: Oct. 17, 2018

(87) PCT Pub. No.: WO2017/182740
PCT Pub. Date: Oct. 26, 2017

(65) Prior Publication Data
US 2019/0093559 A1 Mar. 28, 2019

(30) Foreign Application Priority Data
Apr. 18, 2016 (FR) .................................. 16 53418

(51) Int. Cl.
F02C 7/18 (2006.01)
F01D 25/12 (2006.01)
(Continued)

(52) U.S. Cl.
CPC ................ F02C 7/18 (2013.01); F01D 11/20 (2013.01); F01D 11/24 (2013.01); F01D 25/08 (2013.01);
(Continued)

(58) Field of Classification Search
CPC .... F02C 7/12; F02C 7/18; F01D 25/08; F01D 25/12; F01D 25/14; F01D 25/145;
(Continued)

(56) References Cited

U.S. PATENT DOCUMENTS 4,019,320 A    4/1977 Redinger, Jr. et al.
4,621,492 A *  11/1986 von Pragenau ........... F02K 9/52
                                                  239/132.5
(Continued)

OTHER PUBLICATIONS

Preliminary Search Report for FR 1653418, dated Dec. 12, 2016.
International Search Report for PCT/FR2017/050893, dated Aug. 2, 2017.

Primary Examiner — Ninh H. Nguyen
Assistant Examiner — Aye S Htay
(74) Attorney, Agent, or Firm — Sughrue Mion, PLLC

(57) ABSTRACT

The invention relates to a device (2) for cooling a turbine casing, preferably of a low-pressure turbine of a turbomachine, with air jets, the device comprising a pressurised air supply housing (3) and at least two curved cooling pipes (40) arranged on either side of the housing (3), around and spaced apart from a part of the casing and provided with air injection holes (41), the housing comprising, in particular, a bottom (31) and two longitudinal side walls (32, 33), and the bottom being pierced by air injection holes. The device is characterised in that each of the side walls extends outwards as at least one single-piece tubular sleeve, to which a cooling pipe is joined, the bottom of the sleeve being located at the same level as the bottom of the housing at the point where they are joined together.

11 Claims, 5 Drawing Sheets

(51) Int. Cl.
  *F01D 25/14* (2006.01)
  *F01D 25/24* (2006.01)
  *F01D 11/24* (2006.01)
  *F01D 11/20* (2006.01)
  *F01D 25/08* (2006.01)

(52) U.S. Cl.
  CPC ............. *F01D 25/12* (2013.01); *F01D 25/14* (2013.01); *F01D 25/24* (2013.01); *F05D 2220/30* (2013.01); *F05D 2260/20* (2013.01)

(58) Field of Classification Search
  CPC .... F04D 29/58; F04D 29/5814; F04D 29/584; F04D 29/5886
  See application file for complete search history.

(56) References Cited

U.S. PATENT DOCUMENTS

| | | | |
|---|---|---|---|
| 5,100,291 A | | 3/1992 | Glover |
| 5,205,115 A | * | 4/1993 | Plemmons ............. F01D 11/24 |
| | | | 415/115 |
| 5,540,547 A | | 7/1996 | Cole |
| 6,149,074 A | * | 11/2000 | Friedel .................... F01D 11/24 |
| | | | 165/169 |
| 7,597,537 B2 | * | 10/2009 | Bucaro ................... F01D 11/24 |
| | | | 415/136 |
| 8,869,539 B2 | * | 10/2014 | Daguenet ................ F01D 11/24 |
| | | | 165/169 |
| 2014/0019596 A1 | | 1/2014 | Sharkey |
| 2014/0030066 A1 | * | 1/2014 | Schimmels ............. F01D 11/24 |
| | | | 415/116 |

* cited by examiner

DEVICE FOR COOLING A TURBINE CASING WITH AIR JETS

This Application is a National Stage of International Application No. PCT/FR2017/050893 filed Apr. 13, 2017, claiming priority based on French Patent Application No. 1653418 filed Apr. 18, 2016, the entire contents of each of which are incorporated by reference herein in their entirety.

GENERAL TECHNICAL FIELD

The invention lies in the field of cooling a turbine casing.

The present invention relates more specifically to a device for cooling a turbine casing with air jets, preferably of a low-pressure turbine of a turbomachine.

The invention also relates to a turbomachine provided with such a device.

PRIOR ART

As can be seen in the attached FIGS. 1 and 2, representing the prior art, the low-pressure turbine of a turbomachine is protected by a casing C of a generally flared, substantially truncated cone shape. This casing is cooled using impact cooling technology.

The casing C is provided with one or more pressurized air supply housing(s) B, each of them being connected to multiple cooling lines R.

In the embodiment represented in these figures, the casing C is equipped with two housings B, positioned at approximately 180° from each other (only one being visible in FIG. 2). In addition, each housing B is provided with five lines R, with two pipes T per line, each pipe extending over approximately 90°.

As represented in the underside view of the housing B in the attached FIG. 4, the pipes T and the housing B are pierced by a series of small orifices O opening onto the outer surface of the casing. The pressurized air flowing through these orifices O thus provides impact ventilation of the casing C.

Moreover, and as can be seen in the attached FIG. 3 and in FIG. 4, each pipe T is connected to the housing B via a cylindrical socket D. Each pipe T is brazed into the socket D and each socket D is brazed into the housing B.

However, as can be seen in FIG. 4, the housing B does not have any orifices O at its two ends, nor do the sockets D. On each side of the housing B, there is therefore an area Z1, between the last orifice O of the housing B and the first orifice O of the pipe T, wherein there are no orifices, therefore no air injection and therefore no cooling of the skin of the casing located opposite.

Furthermore, the pipes T over the greatest part of their length have a curved (arched) shape that substantially follows the curvature of the casing C. However, in order to ensure a correct brazing of the pipe T in the socket D, the end of the pipe is rectilinear over an area Z2, (see FIG. 3).

Consequently, the air gap between the pipe T of the line R and the skin (outer surface) of the casing C is not constant over the whole circumference of the casing and in particular the line moves away from the skin of the casing, which has a negative impact on the cooling. Thus it is found that the desired air gap E1 between the pipe and the casing may take increasingly higher values E2, or even E3, as the socket D becomes closer. By way of example, for an air gap E1 of 3.5 mm, the values of E2 and E3 may respectively reach 4.8 mm and 8.5 mm.

The air gap also varies between the bottom of the housing B which is closer to the skin of the casing C (air gap E4) and the end of the pipe T at the place where it is brazed into the socket D (air gap E3).

However, for impact cooling by air jets to be effective, this gap must not only be constant but also of a low value, determined by the specifications of the casing, (generally of the order of 2 mm to 3.5 mm).

To summarize, an absence of cooling of the casing C is therefore observed in the vicinity of each housing B, over two areas Z1 with a length of the order of 25 mm, or 50 mm and poor cooling over two areas Z2 with a length of the order of 60 mm, or 120 mm.

These areas which are not cooled or only slightly cooled are to be multiplied by the number of housings B arranged around the casing C, a number which in some embodiments may be four.

Finally, the operations of fitting and maintaining the cooling lines R on the casing C may potentially highly stress the brazings between the sockets D and the housing B or between the sockets D and the lines R. There is therefore a risk of premature damage to said lines.

A device for cooling a turbine casing by air jets is also known according to document US 2014/109596, which comprises an air supply housing and at least one cooling line comprising two pipes arranged on each side of the housing.

However, the side walls of this housing do not extend via tubular sleeves integral with said side walls and arranged so that their bottoms are at the same level as the bottom of the housing. It follows that the air gap between the outer wall of the casing and the bottom of the housing on the one hand and the air gap between the outer wall of the casing and the cooling pipes are not identical, which does not guarantee optimal cooling.

DESCRIPTION OF THE INVENTION

The objective of the invention is therefore to address the aforementioned drawbacks of the prior art.

Therefore the objective of the invention is notably to provide a device for cooling a turbine casing by air jets which ensures a uniform cooling of the casing, i.e. providing an air gap that is as constant as possible between the cooling line and the outer surface of the casing.

Another objective of the invention is to provide a device that makes it possible to cool one part of the outer surface (skin) of said casing greater than that which can be cooled with prior art devices and thus increase the service life of the casing.

Finally, yet another objective of the invention is to simplify the method of manufacturing the cooling lines and obtain a cooling device of greater mechanical strength.

For this purpose, the invention relates to a device for cooling, by air jets, a turbine casing, preferably a low pressure turbine casing of a turbomachine, comprising a pressurized air supply housing and at least one cooling line comprising two cooling pipes arranged on each side of said housing, said housing comprising a bottom, two longitudinal side walls, two upstream and downstream end walls and an upper wall, and said bottom of the housing being pierced by air injection orifices arranged so as to open toward the casing around which said cooling device is intended to be arranged, each cooling pipe being curved, arranged around a part of the casing and at a distance therefrom and being provided with air injection orifices opening toward the casing.

In accordance with the invention, each of said side walls extends outward via at least one tubular sleeve integral with said side wall, each sleeve is arranged on said side wall so that its bottom is at the same level as said bottom of the housing at the place where they join and each sleeve is configured and dimensioned so that one of the cooling pipes may be connected thereto.

Thanks to these features of the invention, the air gap between the casing and the bottom of the housing and between the casing and the pipes of the cooling line is almost constant, which ensures better cooling. In addition, the fact that the housing is integral with the sleeves structurally reinforces the assembly.

According to other advantageous and non-restrictive features of the invention, taken singly or in combination:

the bottom of the sleeve is pierced, over at least one part of its length, by air injection orifices arranged so as to open toward the casing around which said device is intended to be arranged;

the air injection orifices made in the bottom of the housing are aligned with the air injection orifices made in the sleeves and with the air injection orifices made in the cooling pipes;

the bottom of the housing and the sleeves are curved on each side of a median longitudinal axis of the housing, so as to follow the shape of the casing's contour around which said cooling device is intended to be arranged and so that there is a constant or substantially constant air gap between the outer surface of said casing on the one hand and the bottom of the housing and the bottoms of the sleeves on the other hand;

each sleeve has a junction area with the side wall of the housing and this junction area is flared from the sleeve toward the side wall of the housing and on the portion of its circumference other than that of the bottom of the sleeve;

said upper wall of the housing consists of a cover added on and attached to the side and end walls of said housing;

the cover is attached to the side and end walls of said housing by welding or brazing;

the pipes of the cooling lines are introduced into the free end of the sleeves and connected thereto by brazing.

The invention also relates to a turbomachine comprising a turbine, notably a low-pressure turbine, surrounded by a casing, which comprises a device for cooling said casing by air jets, as mentioned previously.

DESCRIPTION OF THE FIGURES

Other features and advantages of the invention will appear from the description which will now be given, with reference to the appended drawings representing a possible embodiment thereof by way of example and without limitation.

In these drawings.

DETAILED DESCRIPTION

Figure 5:
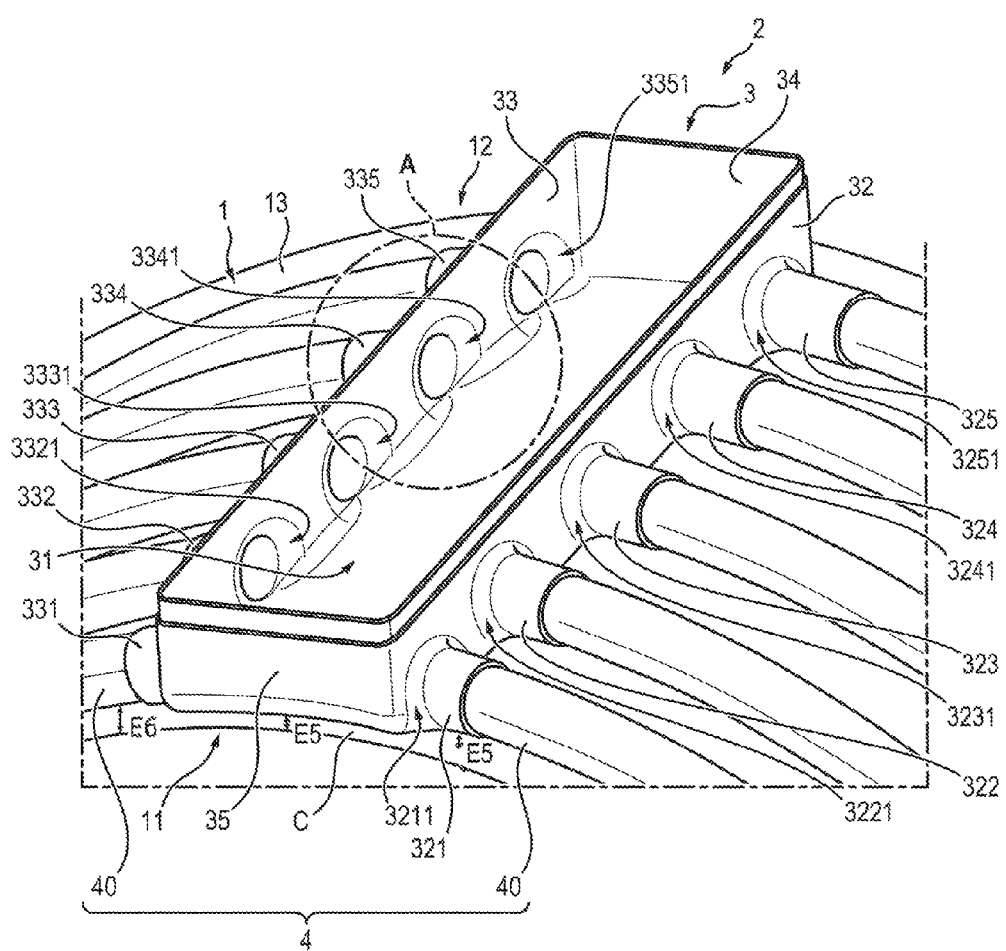
FIG. 5 is a perspective and elevation view of a part of the cooling lines and an air supply housing in conformity with the invention.

As can be seen in FIG. 5, the cooling device 2 in conformity with the invention makes it possible to cool the casing 1 of a turbine. This casing has a flared shape, generally comprising multiple successive truncated cone portions. It has an upstream end 11 and a downstream end 12, with respect to the direction of flow of the gases in the turbine. Its outer surface (skin) is referenced 13.

The cooling device 2 comprises a pressurized air supply housing 3 and at least one cooling line 4.

Each line 4 comprises two pipes 40.

Figure 7:
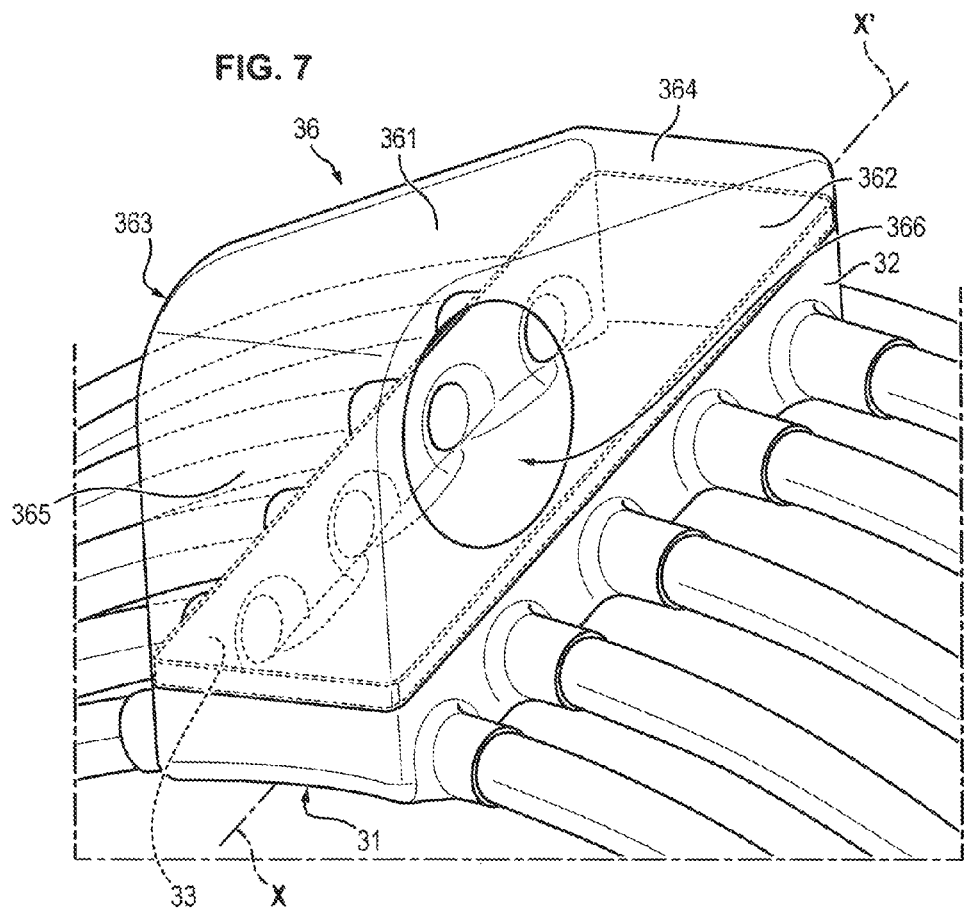
FIG. 7 is a similar view to FIG. 5, but in which the cover of the supply housing is represented.
Figure 8:
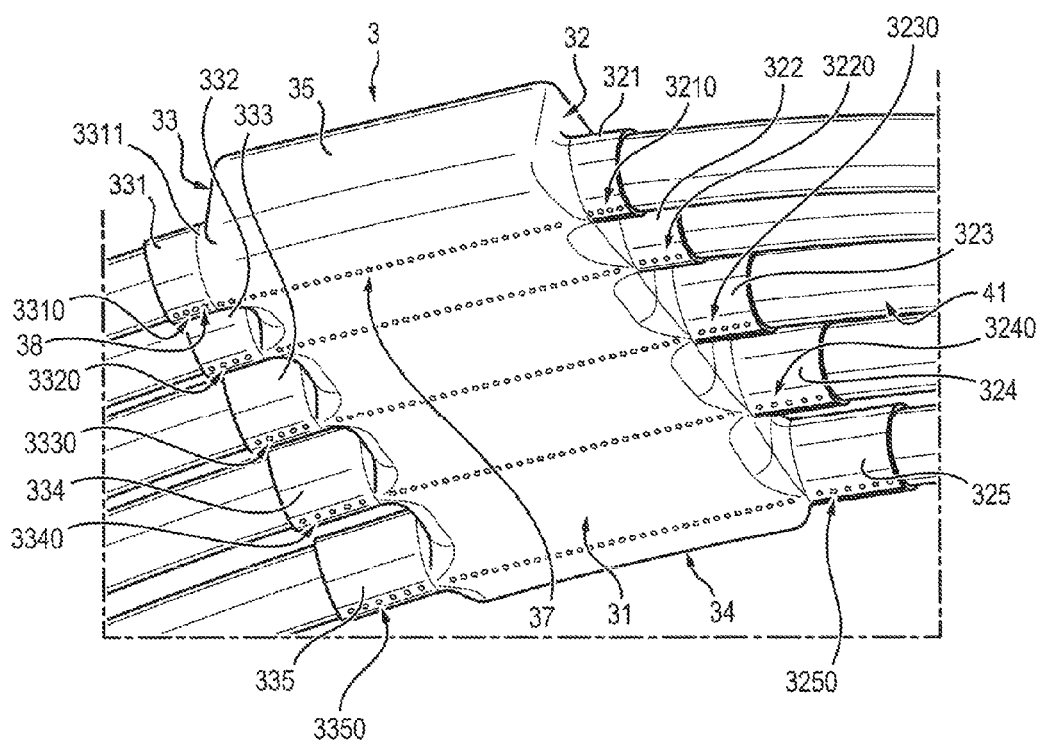
FIG. 8 is a perspective and underside view of a part of the cooling lines and an air supply housing in conformity with the invention.

Preferably, the cooling device 2 comprises multiple lines 4, e.g. five of them in FIGS. 5, 7, and 8, distributed around the casing 1 between the upstream and downstream thereof.

As described previously with the prior art device, the casing 1 may be provided with two cooling devices 2, with, for example, two housings 3, positioned at approximately 180° to one another and whereof the cooling line pipes 40 extend on each side of this housing, over approximately 90°. The casing 1 may also be provided with four cooling housings 3, the cooling line pipes 40 then extending over a lesser angular area.

The housing 3 is connected to a pressurized air supply source, not represented in the figures.

As represented in FIG. 5, this housing 3 is arranged outside the outer surface 13 of the casing 1 and at a distance therefrom. This housing 3 and the lines 4 are attached to the casing 1 e.g. using flanges not represented in the figures. Other methods of attaching the housing are conceivable.

The casing 3 comprises a bottom 31, two longitudinal side walls 32, 33, arranged on each side of the bottom 31 and two upstream 35 and downstream 34 end walls.

Each of said upstream 35 and downstream 34 walls respectively join the bottom 31 with the upstream, respectively downstream ends of the two longitudinal side walls 32, 33. Finally, the housing 3 is closed off by an upper wall 36, not visible in FIG. 5.

In the example represented in FIG. 7, this upper wall 36 is in the form of an added cover attached to the side walls 32, 33 and to the upstream 35 and downstream 34 walls, preferably by welding or brazing.

However, according to another embodiment not represented in the figures, the upper wall 36 could be in one piece with and therefore integral with the other walls 32, 33, 34 and 35. In this case, the housing 3 may, advantageously, be obtained by a casting method or by direct manufacturing (e.g. additive manufacturing).

The bottom 31 is designed to be arranged at a short distance from the casing 1, which is of a flared shape, and this, with an air gap as constant as possible. Accordingly, the bottom 31 is tilted upstream to downstream to follow the truncated cone or substantially truncated cone shape of the casing 1.

The bottom 31 of the housing 3 has a median longitudinal axis X-X' (only represented in FIG. 7).

In the embodiment represented in the figures and as it appears better in FIGS. 5 and 7, the upstream 35 and downstream 34 end walls are parallel with each other or approximately parallel with each other. Owing to the slope of the bottom 31, the upstream wall 35 forms a sharp angle therewith and the downstream wall 34, an obtuse angle.

As can be seen in FIG. 7, the cover 36 comprises an upper wall 361, two longitudinal side walls 362, 363, of triangular shape and arranged on each side of the upper wall 361, and two upstream 365, respectively downstream 364, end walls, joining the two walls 362, 363.

An orifice 366 is pierced in one of the side walls, e.g. the wall 362. This makes it possible to connect the housing 3 to the pressurized air supply source.

Other forms of cover are conceivable without, however, departing from the scope of the invention. The connection to the pressurized air supply source could be provided on any side of the housing 3 except the bottom 31.

In accordance with the invention, each of said side walls 32, 33 of the housing 3 extends outward, via at least one tubular sleeve of a substance (i.e. integral or in one piece) with said side wall.

There are as many sleeves as there are lines 4.

In the example represented in the figures where there are five lines 4, there are thus on each side wall 32, respectively 33, five sleeves referenced from upstream to downstream, 321, 322, 323, 324 and 325 for those arranged on the wall 32 and respectively 331, 332, 333, 334, and 335 for those arranged on the wall 33.

The sleeves are therefore integral with the housing 3. This makes it possible to eliminate the brazing that existed between the sockets and the housing in the prior art cooling devices. Thus, the housing 3 of the invention provides a structural reinforcement of the line assembly since the brazings between the housing and the sockets which constituted points of weakening have been eliminated.

The housing 3 provided with the sleeves 321 to 325 and 331 to 335 is advantageously obtained by casting or by an additive manufacturing method, such as laser fusion, since these manufacturing methods are well suited to parts with complex geometry.

The pipes 40 are fitted in each of said sleeves 321 to 325 and 331 to 335 and attached to these preferably by brazing. The outlet diameters of said sleeves are adapted accordingly.

In addition, each sleeve is arranged on the side wall 32, 33, so that a portion of its circumference, referred to as the "bottom of the sleeve" (in other words its lower part intended to be placed facing the outer surface 13 of the casing 1 when the cooling device is in place), is at the same level as the bottom 31 of the housing, at the place where they join.

The sleeve bottoms are visible in the underside view of FIG. 8. They are referenced, respectively, 3210, 3220, 3230, 3240 and 3250 for the sleeves 321 to 325 and 3310, 3320, 3330, 3340 and 3350 for the sleeves 331 to 335.

Figure 9:
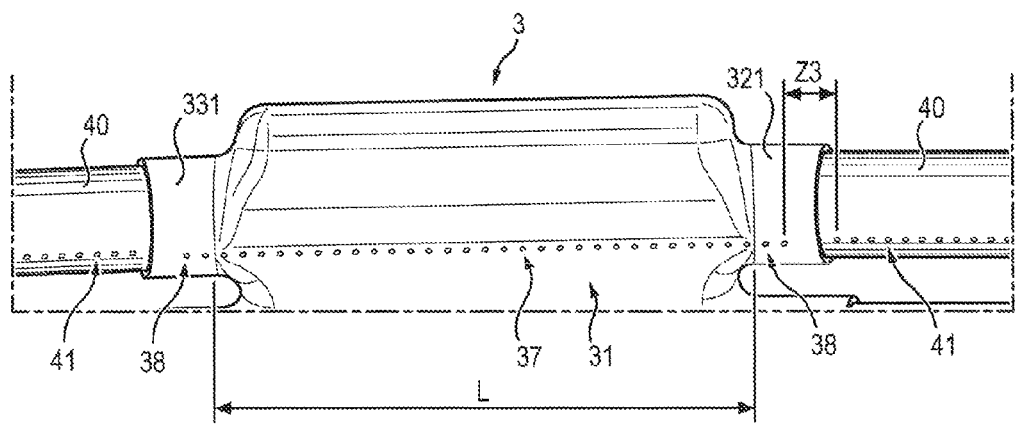
FIG. 9 is a detailed view of FIG. 8.

As can be seen in FIG. 9, each pipe 40 is pierced by a plurality of air injection orifices 41.

As can be seen better in FIGS. 8 and 9, the bottom 31 of the housing 3 is pierced by a series of cooling orifices 37, advantageously arranged in line and preferably over its whole width L.

"The whole width L" means from the point where the bottom 31 joins the side wall 32 (or more precisely one of the sleeves 321 to 325) to the point where the bottom 31 joins the wall 33 (or more precisely one of the sleeves 331 to 335).

The pipes 40 are arranged so that their cooling orifices 41 are aligned with the orifices 37.

Advantageously, each sleeve 321 to 325 and 331 to 335 is also provided with cooling orifices 38 aligned with the cooling orifices 37 of the housing. These orifices 38 are present over the whole length of the sleeve with the exception of its mouth where the pipe 40 is fitted and brazed. The orifices 38 are arranged along the bottoms 3210 to 3250 and 3310 to 3350 of the sleeves.

On the bottom 31 of the housing 3, there are as many rows of cooling orifices 37 as there are lines 4.

Moreover, each pipe 40 is arched, i.e. it is shaped like an arc of a circle the radius of which is slightly greater than that of the portion of the casing opposite which it is intended to be positioned. Also preferably, the bottom 31 of the casing is curved on each side of the median axis X-X', so that its concavity is oriented toward the surface of the casing 1, so as to substantially follow the shape of the casing 1 opposite which the housing is intended to be positioned.

In other words, and as seen in FIG. 7, the sides of the bottom 31 located to the right and left of the median axis X-X' are lower than the center of the bottom extending along said axis X-X'.

Similarly, advantageously, the sleeves 321 to 325 and 331 to 335 are curved so that their concave part, which corresponds to their respective bottoms (bottom lines) 3210 to 3250 and 3310 to 3350 are oriented toward the outer surface 13 of the casing, so as to substantially follow the shape of the casing opposite which they are positioned.

This particular arrangement, combined with the fact that the bottom of each sleeve 321 to 325 and 331 to 335 is at the same height as the bottom 31 of the housing 3 makes it possible to have homogeneous cooling of the casing 1, since the various air injection orifices 37 of the bottom 31 and injection orifices 38 of the sleeves are located at a constant or nearly constant distance (air gap E5) from the outer surface of the casing 1.

Also preferably, this air gap E5 is calculated to be equal or substantially equal to the air gap E6 existing between a pipe 40 (or its cooling orifices 41) and the outer surface 13 of the casing 1. The difference between the two air gaps lies in the thickness of the sleeve.

Preferably, the air gaps E5 and E6 are between 2 mm and 4.5 mm, preferably equal to 3.5 mm.

Figure 1:
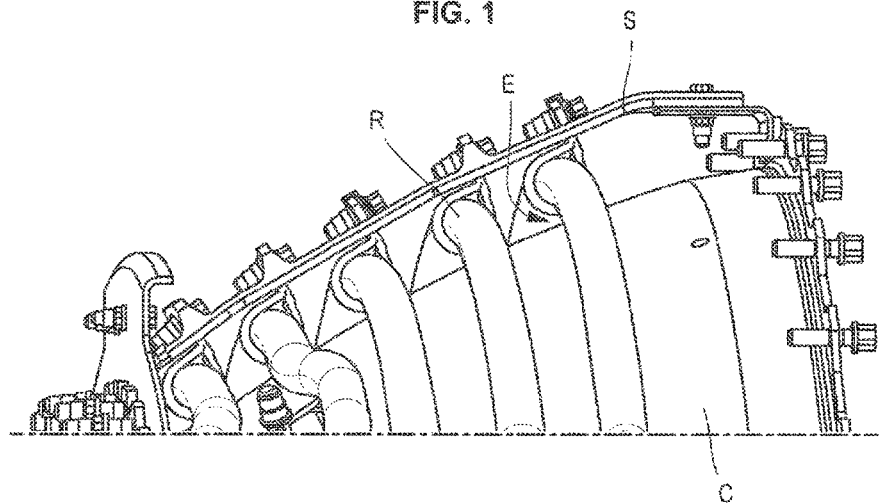
FIG. 1 is a perspective view of a part of a turbine casing of a turbomachine, provided with cooling lines according to the prior art.
Figure 2:
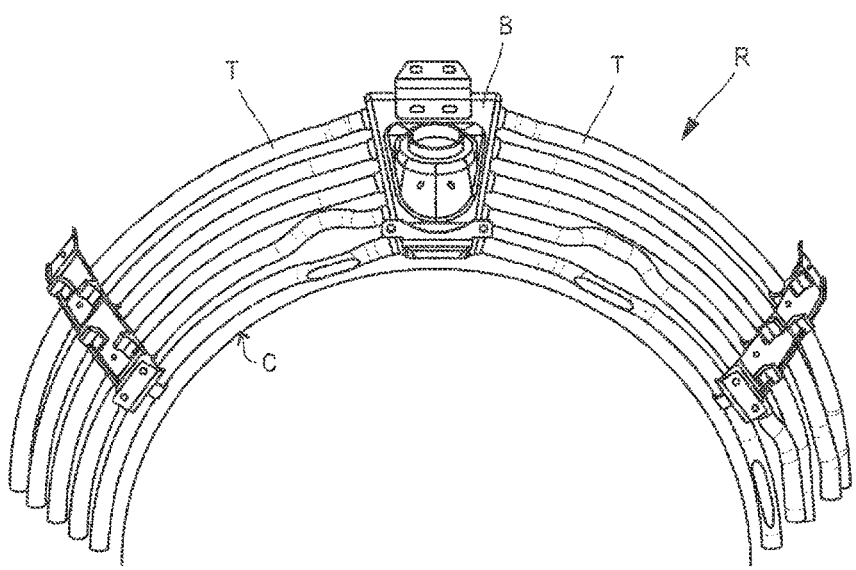
FIG. 2 is a perspective view of an air supply housing and cooling lines according to the prior art.
Figure 3:
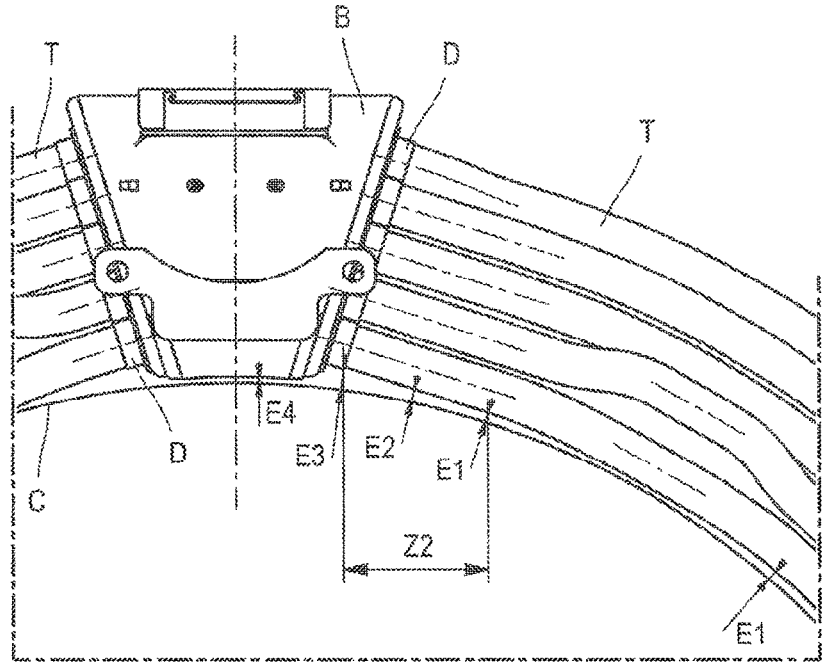
FIG. 3 is an elevation view of an air supply housing and a part of the cooling lines according to the prior art.
Figure 4:
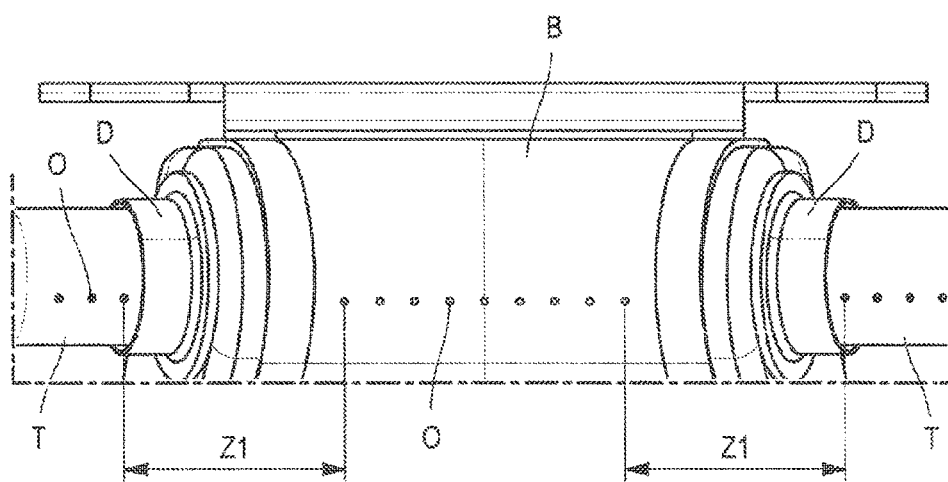
FIG. 4 is a perspective view of the underside of an air supply housing and a part of the cooling lines according to the prior art.

Moreover, the area Z3 between the last cooling orifice 38 and the first orifice 41, in which there are no cooling orifices is a lesser length than the area Z1 of the prior art cooling devices (see FIGS. 4 and 9). A larger part of the casing 1 is thus cooled.

Figure 6:
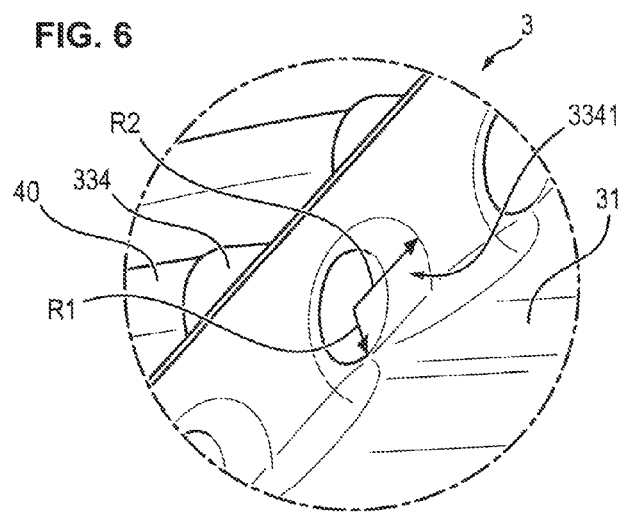
FIG. 6 is a detailed view of the inside area of the housing referenced A in FIG. 5.

Finally, advantageously, and as can be seen better in FIGS. 5 and 6, each sleeve 321 to 325 and 331 to 335 has a junction area with the side wall 32, 33 of the housing 3. This junction area flares out from the sleeve in the direction of said side walls 32, 33 except at the bottom of the sleeve. The junction areas of the sleeves 321 to 325 and 331 to 335 are respectively referenced 3211, 3221, 3231, 3241, 3251 and 3311, 3321, 3331, 3341 and 3351 (the reference 3311 only being visible in FIG. 8).

In other words, the radius R2 of the flared junction area where it is connected to the side wall 32, 33 is greater than the radius R1 of the mouth of the sleeve at the place where it is connected to said junction area (see FIG. 6).

This helps to greatly reduce the pressure losses between the housing and the pipes of the various lines, since the dimensions of the junction area is progressively reduced.

In addition to the aforementioned advantages of the invention, it will be noted that the method of manufacturing the cooling device is simplified since there are fewer brazing operations than with the prior art device.

Moreover, the device is more robust, which also reduces the duration and frequency of repair and maintenance operations.

Finally, the casing being better cooled, its service life is increased.

The invention claimed is:

1. A device for cooling a turbine casing of a turbomachine by air jets, the device comprising:
   a pressurized air supply housing and
   at least one cooling line comprising two cooling pipes arranged on each side of said housing,
   said housing comprising a bottom, two longitudinal side walls, two upstream and downstream end walls and an upper wall,
   each cooling pipe being curved, arranged around a part of the turbine casing and at a distance therefrom
   each of said side walls extending outward via at least one tubular sleeve integral with said side wall, each of the at least one tubular sleeve being configured and dimensioned so that one of the cooling pipes may be connected thereto,
   wherein the bottom of the housing is pierced by air injection orifices arranged so as to open toward the turbine casing around which said cooling device is configured to be arranged,
   wherein each cooling pipe is provided with air injection orifices opening toward the turbine casing,
   and wherein each of the at least one tubular sleeve is arranged on said side wall so that the bottom of each of the at least one tubular sleeve is at the same level as the bottom of the housing at the place where they join.

2. The device according to claim 1, wherein the bottom of each of the at least one tubular sleeve is pierced, over at least one part of its length, by air injection orifices arranged so as to open toward the turbine casing around which said device is intended to be arranged.

3. The device according to claim 2, wherein the air injection orifices made in the bottom of the housing are aligned with the air injection orifices made in each of the at least one tubular sleeves and with the air injection orifices made in the cooling pipes.

4. The device according to claim 1, wherein the bottom of the housing and each of the at least one tubular sleeve are curved on each side of a median longitudinal axis of the housing, so as to follow a shape of a contour of the turbine casing around which said cooling device is configured to be arranged and so that there is a constant or substantially constant air gap between the outer surface of said turbine casing and the bottom of the housing and between the outer surface of said turbine casing and the bottoms of each of the at least one tubular sleeve.

5. The device according to claim 1, wherein each of the at least one tubular sleeve has a junction area with one of the two side walls of the housing and wherein the junction area is flared from the at least one tubular sleeve toward the side wall of the housing and over the portion of a circumference of the junction area other than that of the bottom of the at least one tubular sleeve.

6. The device according to claim 1, wherein said upper wall of the housing consists of a cover added on and attached to the two longitudinal side-walls of said of the pressurized air supply housing and to the two upstream and downstream end walls of the pressurized air supply housing.

7. The device according to claim 6, wherein the cover is attached to the two longitudinal side walls of the pressurized air supply housing and to the two upstream and downstream end walls of the pressurized air supply housing by welding or brazing.

8. The device according to claim 1, wherein each of the cooling pipes of the at least one cooling lines are introduced into a free end of each of the at least one tubular sleeve and connected thereto by brazing.

9. A turbomachine comprising a turbine, surrounded by a casing, wherein the turbomachine comprises a device for cooling said casing by air jets as claimed in claim 1.

10. The device according to claim 1, wherein the turbine is a low-pressure turbine.

11. A turbomachine according to claim 9, wherein the turbine is a low-pressure turbine.

* * * * *